United States Patent Office 3,782,904
Patented Jan. 1, 1974

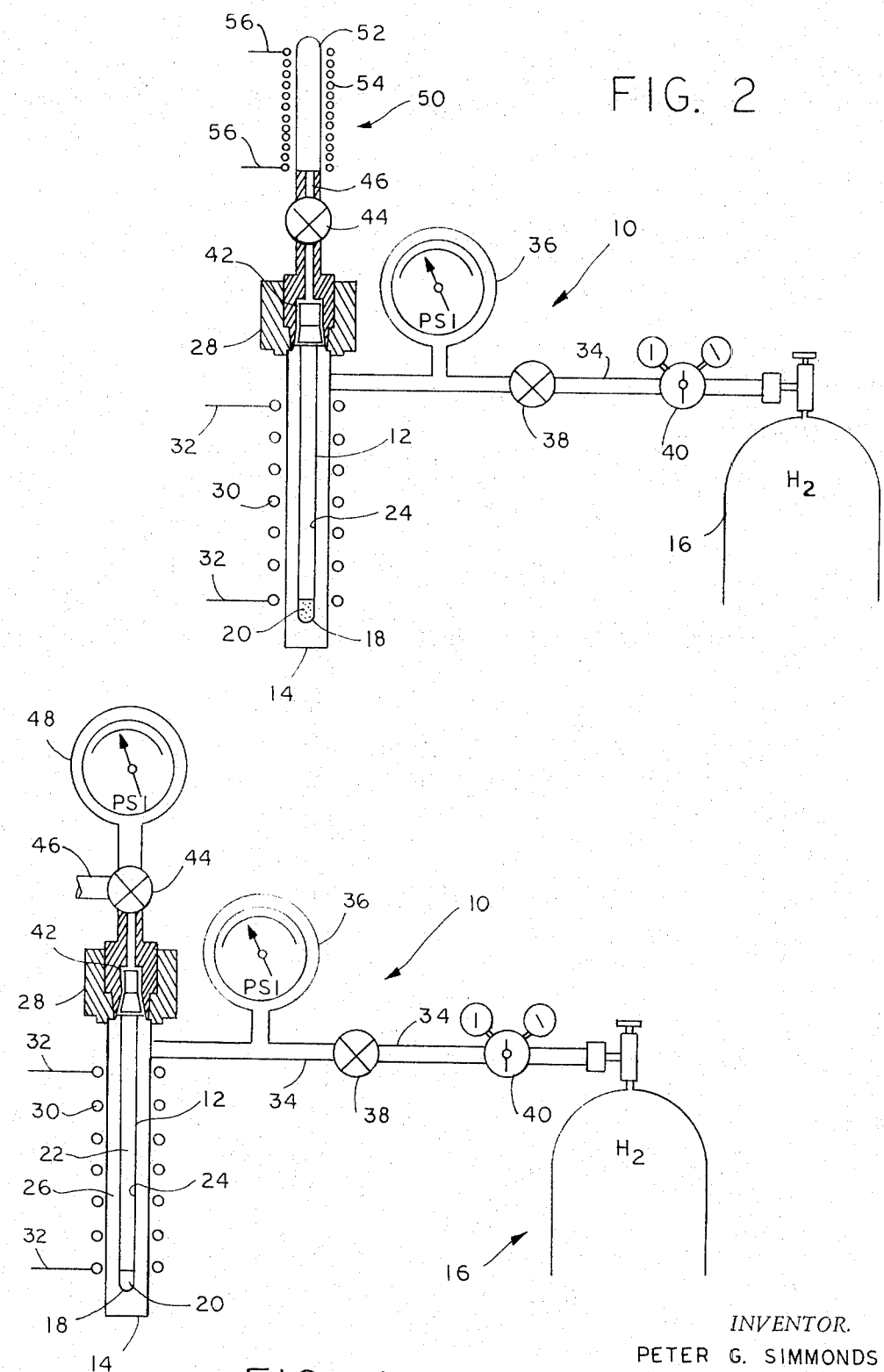

3,782,904
COMPACT HYDROGENATOR
James C. Fletcher, Administrator of the National Aeronautics and Space Administration, with respect to an invention of Peter G. Simmonds, 5200 Palm Drive, La Canada, Calif. 91011
Filed Oct. 7, 1971, Ser. No. 187,365
Int. Cl. B01j 9/04; C07f 1/00
U.S. Cl. 23—284
2 Claims

ABSTRACT OF THE DISCLOSURE

A hydrogenating apparatus which includes a reaction chamber of a material such as a palladium alloy that is selectively permeable to atomic hydrogen and catalytically active to hydrogenating reaction and which contains a reactant that is to be hydrogenated, a shell surrounding the chamber and supplied with hydrogen, and a heating coil for heating the shell to thereby heat the hydrogen therein before it passes through the chamber while the reactant remains therein before it passes through the chamber wall. In one device, hydrogen is pumped out of the reaction chamber while the reactant remains therein to remove molecular hydrogen so that more atomic hydrogen can pass through the chamber walls. In another device, the reactant is pumped through the reaction chamber, and hydrogen is removed from the material leaving the chamber, and the reactant is again cycled through the chamber.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION (1) Field of the invention

The present invention relates to hydrogenation of compounds and, more particularly, to a compact and convenient method and appaartus for carrying out hydrogenation reactions.

(2) Description of the prior art

Hydrogenation of compounds such as olefinic organic compounds is a process which is practiced for many purposes in the laboratory, pilot plant and on an industrial scale. Traditionally, hydrogenation has been performed using finely divided metal catalysts. The most active catalytic metals are noble metals such as platinum and palladium which are very costly. Such catalysts are provided in a finely divided form and it is relatively difficult to recover the catalyst after completion of the reaction. These catalysts are very sensitive to poisoning from impurities such as sulfur containing compounds and it is difficult to reactivate the catalyst in powder form. Moreover, recovery of the hydrogenated material from the reaction mixture may require several separation and purification steps which invariably are costly and time consuming.

Wahlin, in Pat. No. 2,749,293, has disclosed an electrolytic hydrogenator in which hydrogen evolved adjacent the cathode is permeated through a tubular closed end palladium cathode to collect the hydrogen or to perform reduction of simple olefins contained within the cathode. Permeation is accomplished mainly by electrolytic action, though, temperature may be a factor in the diffiusion process. Wahlin prefers to carry such processing at room temperature and at ambient atmospheric pressure. Higher pressures can be achieved by closing off the reaction tube.

The electrolytic hydrogenator of Wahlin is not a practical commercial means of conducting hydrogenation reactions. The electrochmecial cell is unnecessarily complex and requires separate electrodes and electrolyte with the disadvantage of electrolytic dissolution of the expensive platinum or palladium electrodes in the electrolyte and the necessity of handling and utilizing aggressive chemicals such as sulfuric acid. Furthermore, the electrolytic hydrogenator is not adaptable to scaling up to industrial size since that apparatus depends upon the electrolyte for the supply of hydrogen. Thus, the concentration of electrolyte will be continuously changing unless water is continuously replenished to the cell.

SUMMARY OF THE INVENTION

The compact hydrogenator in accordance with the invention provides rapid hydrogenation in a much more convenient and controllable manner. The reaction conditions can be simply and conveniently changed over a wide range of temperatures and hydrogen pressures. Quantitative hydrogenation and other reactions involving substitution or addition of hydrogen or its isotopes, can be effected rapidly, conveniently and in high yield in accordance with the invention by disposing the material to be reacted in a vessel at a first pressure and permeating hydrogen from a higher pressure source through a wall portion of the vessel formed of a hydrogen permeable palladium alloy. The permeation rate of hydrogen through the permeable portion may be increased by heating it to elevated temperature. This also increases the rate of reaction of hydrogen with the sample.

These and many other attendant advantages of the invention will become apparent as the invention becomes better understood by reference to the following detailed description when considered in conjunction with the accompanying drawings.

BRIEF DESCRIPTION OF THE DRAWINGS

FIG. 1 is a schematic illustration of a first embodiment of a compact hydrogenator of this invention;

FIG. 2 is a schematic illustration of another embodiment according to the invention;

DESCRIPTION OF THE PREFERRED EMBODIMENTS

Figure 3:
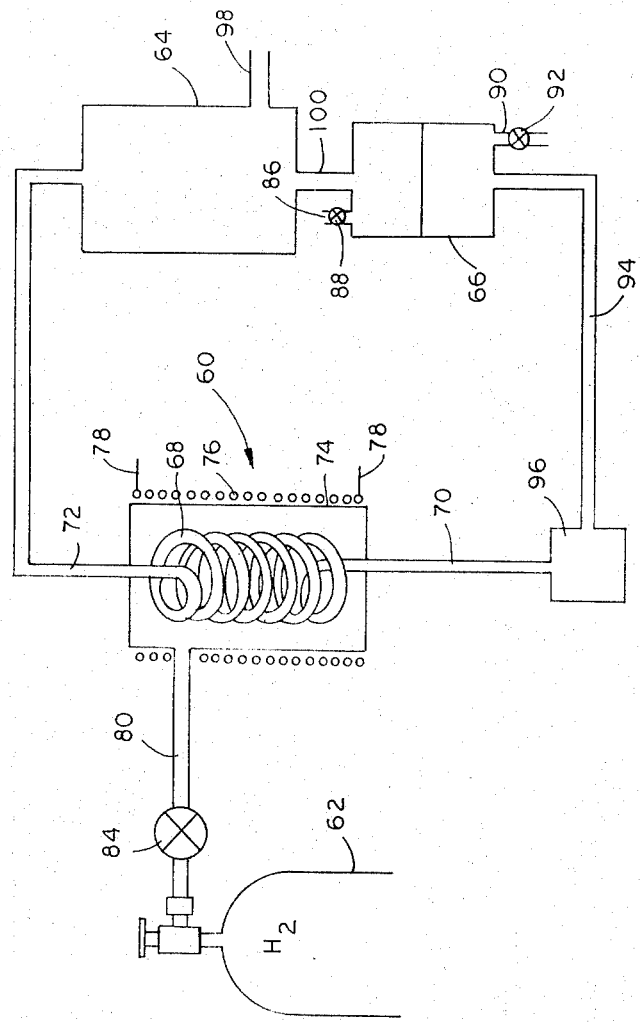
FIG. 3 is a schematic illustration of a multiple-pass hydrogenator.

Previous catalyst studies [1] utilizing palladium-silver alloys have established that compounds containing $\alpha$-$\beta$ conjugated ethylenic bonds may be relatively easily quantitatively hydrogenated when in contact with the metal surface in a hydrogen poor atmosphere. However, these studies have shown that at low hydrogen pressure, monoolefins such as 1-hexene, 2-hexene, cyclohexene, benzene and 2-methyl, -2-hexene show little tendency to hydrogenate. In accordance with the invention, it has been discovered that compounds containing unconjugated ethylenic bonds may be hydrogenated by continuously flowing pure hydrogen gas through the selectively permeable catalytic palladium wall at high pressure in contact with the sample.

Apparatus suitable for practicing the invention includes a reaction chamber formed of a hydrogen permeable palladium alloy disposed in a closed vessel. The sample is placed within the chamber and the vessel or the chamber is pressurized with hydrogen. The hydrogen pressure equal- ---
[1] Analytical Chemistry, vol. 42, p. 881 (1970), Simmonds et al.

izes across the palladium wall, and at a faster rate when the wall is heated to a more permeable condition.

When the reaction is complete, the hydrogen is vented and the hydrogenated sample removed from the chamber. It is preferred to pressurize the outer vessel with hydrogen since the wall of the reaction chamber is selectively permeable to hydrogen. Therefore, impurities will collect in the annular space between the chamber and the vessel wall and only pure hydrogen traverses the wall and reacts with the sample.

Pure palladium when subject to temperature cycling in the presence of hydrogen suffers mechanical distortions. However, an alloy of palladium containing 10% to 50% silver, preferably between 20% to 40% silver, is as permeable to hydrogen and is mechanically stable. Other palladium alloys, for example, palladium-rhodium, palladium-gold, palladium-ruthenium, or palladium-nickel are generally less permeable to hydrogen. However, such alloys may exhibit different catalytic properties and may be desired for conducting certain reactions.

The palladium reaction chamber may be provided in various configurations and lengths of tubing may be connected in parallel to provide increased surface area with less flow resistance. Membranes or tubes can also be formed from a base structural material such as a porous ceramic coated with a thin film of palladium or a suitable hydrogen-permeable palladium alloy. Increased internal surface area may be provided by etching or provision of a spongy palladium material to increase the available surface for reaction.

The hydrogen flux through a film of palladium for a given hydrogen pressure is dependent on tube geometry, wall thickness and wall temperature. The selectivity of the film to permeation of hydrogen is independent of thickness. However, the rate of permeation is inversely proportional to thickness of the film. Thus, the thinnest film possible is most desirable for purposes of permeation. However, the film must be thick enough to withstand collapse from hydrogen pressure during reaction. Preferably, the wall of the reaction chamber should be of the thickness in the range from about 1 mil to about 10 mil.

The permeability of a palladium film is also dependent directly upon the pressure differential maintained between the high and low pressure side of the film. The higher the pressure differential, the greater the permeability of the film. Any differential pressure can be utilized in accordance with the invention that will not destroy the film. For a 6-mil film, a palladium alloy containing 25% silver can withstand a collapse pressure differential of about 300 p.s.i.

The temperature of the film also effects its permeability. In general, permeation rates through solids increase exponentially with increase in temperature. At low pressure from atmospheric to about 50 p.s.i.g. and room or subambient temperature, the permeation rate through a 4 to 6 mil thick palladium film is low but is suitable for conducting certain vigorous reactions in order to prevent depolymerization or scission of the compound at the double bond. However, for most reactions, it is preferred to increase the permeation rate by raising the temperature to at least 50° C. The temperature should be maintained below the decomposition temperature of the sample or hydrogenated product. However, olefinic compounds have successfully hydrogenated in the apparatus of the invention at temperatures up to 250° C.

The film may be maintained at a more hydrogen permeable temperature by external heating means such as by placing the device in an oven or by applying an insulated electric heating coil to the reaction chamber or surrounding vessel. In some configurations, the wall of the reaction chamber provides a sufficient internal resistance to produce the desired heating on passage of electric current through the wall.

The hydrogenation apparatus of the invention is primarily applicable to the reduction of carbon double of triple bonds such as monoalkenes containing 2 to 30 carbon atoms, conjugated and unconjugated dienes containing 4 to 30 carbon atoms. Reduction occurs only in olefinic bonds in $\alpha,\beta$ conjugated systems such as unsaturated aldehydes, nitriles, esters, ketones and does not occur at the functional group. Exemplary compounds reactable in the apparatus of the invention at a conversion level of at least 90% are listed in the following table.

TABLE I

| Starting compound: | Product |
|---|---|
| Acrolein | Propionaldehyde. |
| Acrylonitrile | Propionitrile. |
| Methyl acrylate | Methyl propanoate. |
| Methyl vinyl ketone | Methyl ethyl ketone. |
| 2,4-hexadiene | Hexane. |
| 1,5-hexadiene | Hexane. |
| Styrene | Ethyl benzene. |
| Acetylene | Ethane. |

An apparatus suitable for practicing the process of the invention is illustrated in FIG. 1. The compact hydrogenator 10 generally includes a closed tube 12 formed of a hydrogen-permeable palladium alloy disposed in an outer closed vessel 14 which is connected to a source of high pressure hydrogen 16. The lower end 18 of the tube 12 forms a reservoir for receiving a sample 20 of hydrogenatable material. The upper open portion 22 of the tube 12 forms a reaction chamber. The inner wall 24 of the tube provides a surface catalytically active to the vapors of the sample 20 and the hydrogen which permeates through the wall of the tube 12. The tube 12 may be of any convenient size, but typically may be ⅛ inch O.D. with a 4-mil thick wall.

An annular chamber 26 is formed between the tube 12 and the outer shell 14 which may be formed of stainless steel. A gas-tight fitting 28 is connected to the upper end of tube 12 and shell 14 and encloses the annular chamber 26. Means for heating the inner tube 12 to a more hydrogen-permeable temperature may be provided such as by surrounding the outer shell 14 with an insulated coil heater 30 which is connected through leads 32 to a variable electrical power supply, not shown.

The high pressure hydrogen supply such as cylinder 16 is connected to the outer shell 14 by means of a branch conduit 34 containing a pressure gauge 36, valve 38 and pressure regulator 40. The fitting 28 seals off the annular space 26 but contains a central vent 42 connected to valve 44. Valve 44 may be turned toward vent pipe 46 or toward pressure gauge 48.

In operation, the sample to be hydrogenated is placed in tube 12 which is then sealed within outer tube 14 by means of the fitting 28. Regulator 40 and valve 38 are then operated to introduce hydrogen at the desired pressure as read on gauge 36 into the annular chamber 26. Valve 38 is closed and the coil 30 is energized to heat the apparatus to the desired temperature. Hydrogen permeates from annular chamber 26 through the wall of the inner tube 12 and enters the catalytically active reaction chamber 22 and reacts with the sample 20 to form hydrogenated products. The unsaturated precursor 20 and hydrogenated end products are retained within the tube 12.

Hydrogen is selectively permeable to the wall of tube 12 and permeates and diffuses into the tube and is maintained at high pressure due to the pressure in the outer annular chamber 26. In the absence of the outer chamber 26 formed by the shell 14, hydrogen would be lost by catalytic reaction with atmospheric oxygen at the outer surface of the tube 12. If excessive pressure develops within tube 12, valve 44 can be turned to vent 46 to release excess hydrogen to the atmosphere. When the reaction is completed, the apparatus is cooled, and fitting 28 is opened to remove the hydrogenated product from the bottom of tube 12.

The apparatus of FIG. 1 was utilized for quantitative hydrogenation of milligram quantities of a simple monoolefins. Hexene was quantitatively hydrogenated in less than 30 minutes at a temperature of 100° C. and hydrogen pressure of 30 p.s.i.g. At room temperature, after 1½ hours at 50 p.s.i.g., hexene was 50% converted to hexane. After 24 hours under these conditions, the reaction was complete. Methylmethacrylate was converted quantitatvely to methylisobutyrate in 30 minutes at 60 p.s.i.g. hydrogen pressure and 100° C. temperature. The method has broad application since even sterically hindered olefins may be quantitatively hydrogenated. For example, di-tertiary-butyl ethylene was quantitatively hydrogenated to di-tertiary butyl ethane is about an hour at 100 p.s.i.g. hydrogen pressure and a temperature of 150° C.

After the apparatus is cooled to ambient, and excessive hydrogen has been vented by means of valve 44, the hydrogenated product may be poured or pipetted from tube 12. Since the catalyst is in the form of a solid tube, no separation of catalyst and hydrogenated product is required as has been customary with the processes utilizing powdered catalysts. Since the hydrogen is believed to permeate through the metal lattice of the palladium tube as atomic hydrogen, very efficient catalytic hydrogenation occurs between the ultrapure atomic hydrogen and the unsaturated compound. The palladium-silver alloy tubes can be used for several successive hydrogenations. However, to assure maximum efficiency, the tubes should be activated before each hydrogenation by heating in air at 400° C. for approximately 4 hours. This can be conveniently accomplished in a furnace. The quantitative uptake of hydrogen can be determined by means of the usual pressure-volume relationships, by accurately measuring pressure on gauges 36 and 48 and knowing the volumes of the inner and outer chambers.

Another embodiment of a compact hydrogenator apparatus, as illustrated in FIG. 2, may be utilized to provide very rapid hydrogenation of small samples. The compact hydrogenator 10 is generally similar to that shown in FIG. 1. The apparatus further includes a hydrogen pump 50 attached to the vent pipe 46. The hydrogen pump comprises a closed end palladium tube 52, surrounded by a heater coil 54 connected through leads 56 to an independent, variable power supply, not shown. During hydrogenation, valve 44 is turned toward tube 52 and coil 54 is energized to heat tube 52 to a hydrogen permeable temperature.

Thus, excess, unused hydrogen which converts to the molecular $H_2$ form is removed through the pump 50, by being pumped through the wall of the tube 52 and reacts with the oxygen in the surrounding atmosphere. This affords a very effective pumping action to remove excess molecular hydrogen which is not effective in the reaction and permits freshly diffused atomic hydrogen to pass through the wall of tube 12 where it more readily and efficiently reacts with sample 20 on the interior surface 24 of the reaction chamber tube 12. Since only molecular hydrogen gas can diffuse through the wall of tube 52, none of the vapors of starting material or reacted hydrogenated product are lost. Although the reaction is more rapid with this technique, stoichiometric uptake cannot be as readily determined.

The embodiments of FIGS. 1 and 2 have been used successively for simple laboratory scale batch hydrogenations of olefinic compounds. These apparatus could be scaled up to the size suitable for pilot plant scale or industrial processing. It is also possible to perform hydrogenation according to the method of the invention by either multiple pass recycling or single pass continuous systems.

Referring now to FIG. 3, a batch recycling system is illustrated generally including hydrogenation unit 60, a hydrogenation supply cylinder 62, a gas liquid separator 64 and a sample reservoir 66. The hydrogenation unit 60 includes a coil 68 formed of a hydrogen-permeable material such as a palladium-silver alloy having an inlet 70 and an outlet 72. The coil 68 is enclosed within a shell container 74, the outer surface of which is heated by means of an insulated heating coil 76 powered by a variable electrical heater supply, not shown, through leads 78. A branch conduit 80 connects the container 74 to the hydrogen supply container 62 through a valve 84. Unhydrogenated sample is added to the reservoir container 66 through an inlet 86 containing a valve 88. The reservoir container is also supplied with a drain extension 90 containing a valve 92. A recycle conduit 94 including a pump 96 is connected to the inlet 70 to the coil 68. The outlet 72 of the coil is connected to the gas liquid separator 64. Gas is removed from the separator 64 through vent 98 while the liquid flows through outlet pipe 100 into the reservoir 66.

In operation of the recycling system of FIG. 3, unhydrogenated sample is placed in reservoir 66 by means of inlet 86 and then valve 88 is closed. The container 74 is pressurized by opening valve 84. After the heating coil 76 is turned on to raise the coil 68 to a more permeable condition, hydrogen permeates into coil 68. Pump 96 is then energized and sample sweeps through the coil 68 and partially reacts with atomic hydrogen permeating into the coil 68. The liquid-gas mixture flows out outlet 72 into the gas liquid separator 66 where molecular hydrogen is removed through vent 98 and reacted and unreacted liquid falls through outlet 100 into the reservoir 66. The liquid mixture is returned by recycle conduit 94 and pump 96 to the coil 68 where it reacts with freshly diffusing atomic hydrogen. The system is maintained in operation until all sample is hydrogenated and recovered in reservoir 66. If necessary, the system is cooled and the hydrogenated sample is removed through drain valve 92.

Figure 4:
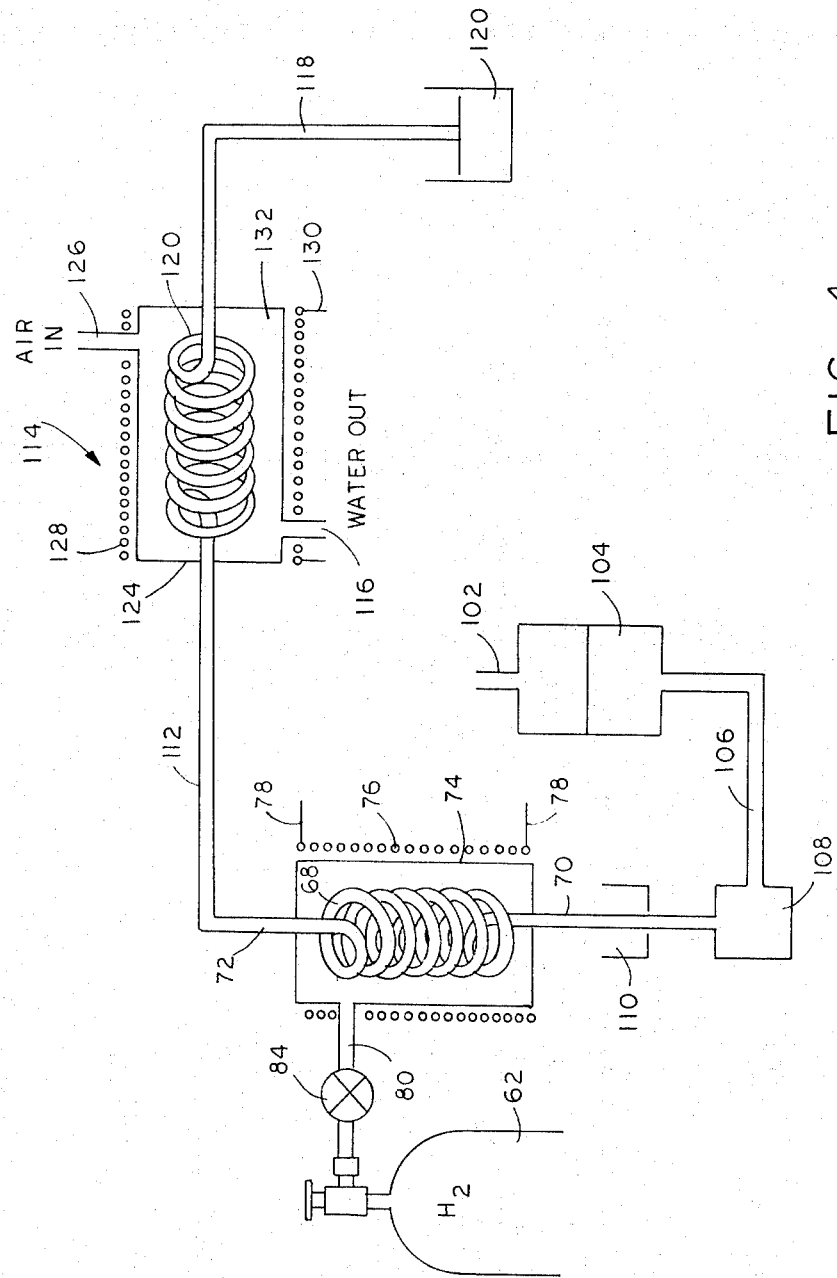
FIG. 4 is a schematic illustration of a single-pass continuous hydrogenator.

A single pass, continuous hydrogenator is illustrated in FIG. 4. In this embodiment, the sample reservoir has a single inlet 102 for introducing the unhydrogenated sample 104 and for connection to an inert gas pressurizing source, if required. The sample 104 flows through conduit 106 to the pump 108 and through a vaporizer 110 such as a heating coil before entering the inlet 70 to the coil 68. The temperature maintained within the coil 68, the pressure applied by means of the hydrogen supply cylinder 62 and the surface area and length of the coil 68 are sufficient such that all of the vaporized sample is reacted with the atomic hydrogen and is quantitatively hydrogenated before entering outlet 72. The hydrogen-hydrogenated product mixture flows through outlet conduit 112 into a gas-liquid separator 114 in which all inert gas and hydrogen gas are removed through vent 116 and all hydrogenated liquid product flows through drain 118 into the sample collector 120.

Preferably, the separator 114 includes a second hydrogen-permeable palladium coil 122 disposed in an outer container 124 having an inlet 126. The container is surrounded with an insulated electrical heating coil 128 which is connected through leads 130 to a variable power supply, not shown. As air flows through inlet 126 into the annular chamber 132 it acts to pump hydrogen through the wall of coil 120 by reacting with the permeating hydrogen to form water which leaves through drain 116. The hydrogenated sample flows through tube 118 into the collector 120. The tubes 68 and 120 could be connected as anode and cathode in an electrolyte and the hydrogen collected in the tube 120 could be recycled to the tube 68 as disclosed in the electrolytic hydrogen generator-separator, Pat. No. 3,690,835, issued Sept. 12, 1972.

The last two embodiments of the invention are readily adapted for scaling up to pilot plant and commercial size. The present invention provides rapid hydrogenation under reaction conditions which can be simply and conveniently varied to cover a wide range of temperature and hydrogen pressures. Hydrogenation is conveniently and easily controlled simply by selection of appropriate temperature and pressure for the reaction.

It is to be understood that only preferred embodiments of the invention have been described and that numerous substitutions, modifications and alterations are all permissible without departing from the spirit and scope of the invention as defined in the following claims.

What is claimed is:

1. A hydrogenation reaction apparatus comprising in combination:
    a reaction chamber formed of a material selectively permeable to hydrogen and catalytically active to hydrogenation reactions and having first and second open ends;
    an outer shell surrounding said chamber forming a closed annular compartment;
    supply inlet means for introducing hydrogen into said outer shell;
    pumping means connected to a first end of the chamber for flowing material to be hydrogenated into said chamber;
    a hydrogen separator connected to the second end of the chamber;
    recycle means for returning the output from said separator to said pumping means; and
    product recovery outlet means for removing some of the material which has been hydrogenated in the chamber.

2. A hydrogenation reaction apparatus comprising in combination:
    walls forming a reaction chamber and a gas compartment, one within the other and the walls of the innermost one formed of a material that is selectively permeable to hydrogen and catalytically active to hydrogenation reactions;
    supply inlet means for introducing hydrogen into said gas compartment;
    pumping means connected to said reaction chamber for flowing material to be hydrogenated into said chamber;
    a hydrogen separator connected to the chamber for drawing off material in the chamber and separating at least some of the hydrogen from other material which has been drawn off;
    recycle means for returning the material in the separator from which hydrogen has been removed, to said pumping means; and
    product recovery outlet means for removing some of the material which has been hydrogenated in the chamber.

References Cited

UNITED STATES PATENTS

| | | | |
|---|---|---|---|
| 3,210,162 | 10/1965 | Rudd | 23—285 |
| 3,350,846 | 11/1967 | Makrides et al. | 55—16 |
| 2,536,610 | 1/1951 | King et al. | 55—158 |
| 3,214,245 | 10/1965 | Peters, Jr. | 23—252 R |

JAMES H. TAYMAN, JR., Primary Examiner

U.S. Cl. X.R.

23—290, 289, 252 R; 55—158, 16; 48—DIG. 005; 260—409, 690